United States Patent [19]

Inoue et al.

[11] 3,945,788

[45] Mar. 23, 1976

[54] APPARATUS OF MAKING REPRODUCTION PRINTING PLATES

[75] Inventors: Yoshimi Inoue, Yokohama; Takeo Yukie, Machida, both of Japan

[73] Assignee: Kabushiki Kaisha Asahi Shimbunsha, Japan

[22] Filed: June 13, 1975

[21] Appl. No.: 586,547

Related U.S. Application Data

[60] Continuation-in-part of Ser. No. 365,857, June 1, 1973, abandoned, and a continuation of Ser. No. 484,947, July 31, 1974, said Ser. No. 365,857, is a division of Ser. No. 253,774, May 16, 1972, abandoned, said Ser. No. 484,947, is a continuation-in-part of Ser. No. 253,774.

[30] Foreign Application Priority Data

June 29, 1971 Japan .............................. 46-47463

[52] U.S. Cl. .................. 425/363; 425/71; 425/373; 264/175; 264/220; 101/382 MV

[51] Int. Cl.[2] .......................................... B29C 15/00

[58] Field of Search ............. 264/284, 76, 175, 220, 264/219, 227; 425/223, 224, 363, 237, 101, DIG. 200, DIG. 201, 335, 71; 101/382 MV

[56] References Cited

UNITED STATES PATENTS

| | | | |
|---|---|---|---|
| 1,377,506 | 5/1911 | Novatny | 101/382 MV |
| 2,471,392 | 5/1949 | Campbell | 425/363 X |
| 2,526,318 | 10/1950 | Battin | 425/373 X |
| 2,788,743 | 4/1957 | Schwerin | 101/382 MV |
| 3,085,292 | 4/1963 | Kindseth | 425/71 X |
| 3,216,059 | 11/1965 | Voelshow | 425/373 X |
| 3,509,819 | 5/1970 | Canole | 101/382 MV |
| 3,515,778 | 6/1970 | Fields et al. | 425/101 X |

*Primary Examiner*—Robert L. Spicer, Jr.
*Attorney, Agent, or Firm*—Hill, Gross, Simpson, Van Santen, Steadman, Chiara & Simpson

[57] ABSTRACT

A method of making reproduction printing plates having steps of disposing an opposed member against a roll member which has on its outer surface a matrix with a predetermined gap therebetween, supplying a molten thermoplastic material to the gap, and driving at least one of the opposing and roll members to press and roll the molten thermoplastic material onto the matrix.

An apparatus of making reproduction printing plates having a matrix, a roll member having thereon the matrix, an opposing member disposed against the roll member with a predetermined gap therebetween, a device for supplying molten thermoplastic material to the gap, and a device for driving at least one of the roll and opposing members to press and roll the molten thermoplastic material.

4 Claims, 16 Drawing Figures

10
10a
10b
11
11a
11b
13
14
15
15'
16
17
18
a1
a2
a5
a6
(W)

APPARATUS OF MAKING REPRODUCTION PRINTING PLATES

CROSS REFERENCE TO RELATED APPLICATION

This application is a continuation in part of our application Ser. No. 365,857 filed June 1, 1973, now abandoned, which is a divisional application of Ser. No. 253,774 filed May 16, 1972, now abandoned. This application is also a continuation of application 484,947 filed July 31, 1974 which was a continuation-in-part of Ser. No. 253,774.

BACKGROUND OF THE INVENTION

1. Field of the Invention

This invention relates to a method of making a reproduction printing plate (hereinafter referred to as a printing plate) of a synthetic resin, and more particularly to a method of making a printing plate for use with a high-speed rotary press.

2. Description of the Prior Art

Almost all of printing plates heretofore used with the high-speed rotary press are stereotypes. However, the stereotypes are very heavy in weight, as well known, and very difficult to assemble with or disassemble from the rotary press, which naturally leads to a decrease in the work efficiency to provide for lowered rate of operation of the rotary press. This is a serious defect for printing newspapers which must be promptly distributed in large quantities.

To avoid such defects of the stereotype as above described, a printing plate of synthetic resin has recently been proposed. However, such a printing plate of synthetic resin also has many defects such as necessity for pressing of the synthetic resin on a matrix for an appreciably long time, low accuracy of the dimensions of the finished printing plate and the necessity for back scraping the printing plate during finishing.

SUMMARY OF THE INVENTION

In view of the foregoing, the primary object of this invention is to provide a novel method and apparatus for making a printing plate which is free from the defects experienced in the conventional method of making printing plates of synthetic resin.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

To facilitate a better understanding of the present invention, a description will be given first of the principal part of a high-speed rotary press with which a printing plate of this invention is used.

Figure 1:
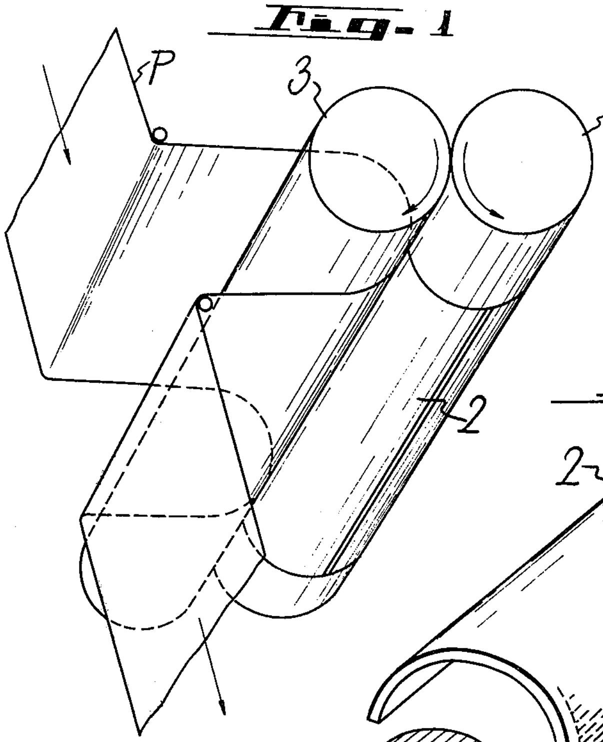
FIG. 1 is a perspective view schematically showing a plate cylinder section of a rotary press.
Figure 2:
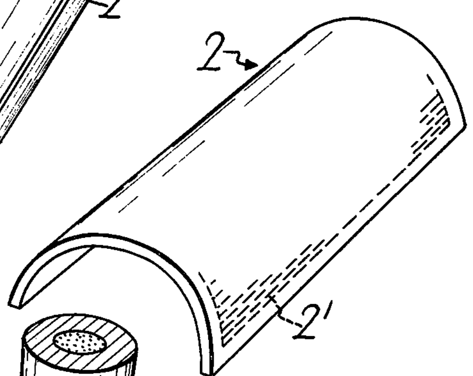
FIG. 2 is a perspective view showing a stereotype for use with the rotary press.

FIG. 1 schematically illustrates a plate cylinder section of an ordinary type of rotary press. In FIG. 1 reference numeral 1 indicates a plate cylinder, 2 a semicircular printing plate wrapped around it (refer to FIG. 2) and 3 an impression cylinder held in rotary contact with the plate cylinder 1. The plate cylinder 1 and the impression cylinder 3 are driven at high speed in synchronism with each other and a web of paper P is fed between them and rotary printing is achieved at a high speed corresponding to the peripheral speed of the printing plate 2. The plate face 2' of the printing plate 2 shown in FIG. 2 is usually relieved.

A conventional stereotype used with such a rotary press is produced by processes: type form dry matrix stereotype, as well known, and the stereotype thus produced has many advantages such as (high fidelity of the plate face), high accuracy of dimensions such as thickness and so on, high efficiency of the production with automation on the above processes and low cost resulting from repetitive use of the material.

However, the conventional stereotype has a serious defect in that it is too heavy because of the material used. The stereotype for use with, for example, a high-speed rotary press for newspaper printing may weigh about 18 kilograms. Accordingly, assembling or disassembling of the stereotype with or from the plate cylinder is very hard labor, which causes occupational diseases such as sore backs and the like and lowers the rate of operation of the rotary press because of the time required to change plates and imposes a severe limitation on the speed of printing of newspapers.

Further, a printing plate of synthetic resin has been developed as a substitute for conventional stereotypes. This printing plate has heretofore been made by pressing softened sheet-like or kneaded thermoplastic resin on a matrix with a hydraulic press and tearing it off from the matrix after cooled. With such a method, the synthetic resin must be pressed on the matrix for an appreciably long time and accuracy of the dimensions of the finished printing plate is poor and finishing processes such as back scraping and so on are required. Thus, the printing plate of synthetic resin is inferior to that of the stereotype.

Figure 3:
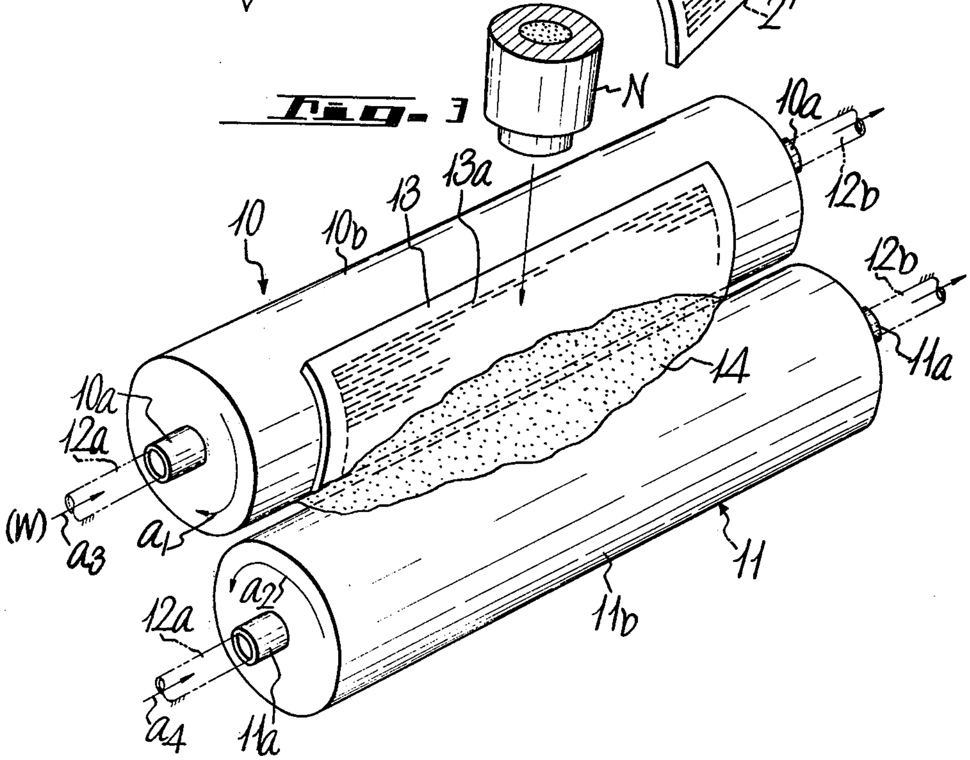
FIG. 3 is a perspective view schematically illustrating the principal part of a printing plate producing apparatus of this invention.
Figures 4, 5:
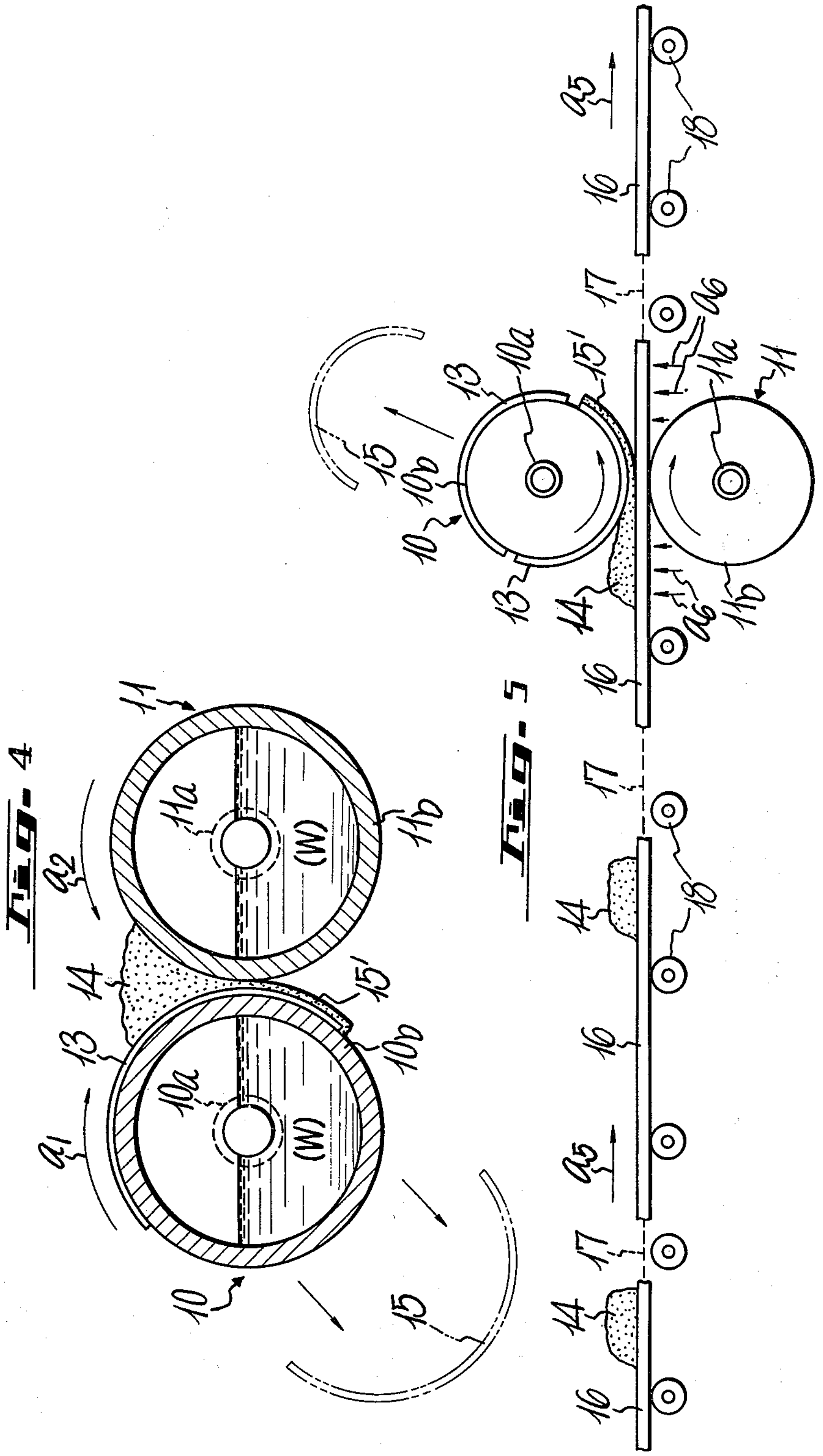
FIG. 4 is a cross-sectional view of the part shown in FIG. 3.
FIG. 5 is a side view schematically illustrating another example of this invention.

Referring now to FIGS. 3–5, a description will be given of a method and apparatus for making a printing plate according to this invention.

FIGS. 3 and 4 schematically illustrate the principal part of one example of a printing plate apparatus of this invention. Reference numeral 10 indicates a hollow matrix cylinder. 11 a hollow impression cylinder disposed in parallel thereto and 10*a* and 11*a* shaft tubes projecting from both end faces of the cylinders 10 and 11 centrally thereof. The shaft tubes 10*a* and 11*a* are rotatably supported by suitable known bearing means, though not shown, and the matrix cylinder 10 and the impression cylinder 11 are driven in directions indicated by arrows $a_1$ and $a_2$ in FIG. 3 so that their peripheries 10*b* and 11*b* have the same peripheral speed. The drive mechanism therefore is a known one, and hence will not be described.

Further, feed pipes 12*a* and 12*a* and drain pipes 12*b* and 12*b* are respectively coupled to the shaft tubes 10*a* and 11*a* of both cylinders 10 and 11 in a watertight manner, as indicated by chain lines, to circulate cooling water W through the cylinders 10 and 11 in directions, for example, indicated by arrows $a_3$ and $a_4$, thereby to achieve cooling of molten resin. The feed and drain pipes 12*a* and 12*b* are fixed to a frame or the like, not shown.

In the apparatus depicted in FIG. 3, the distance between the axes of the matrix cylinder 10 and the impression cylinder 11 is adjustable and a matrix 13 is wrapped around the cylindrical peripheral surface 10*b* of the matrix cylinder 10. Between the matrix 13 and the cylinderical peripheral surface 11*b* of the impression cylinder 11, molten resin 14 is fed and spread to a predetermined thickness while being pressed on the matrix 13 by the inward rotation of both cylinders 10 and 11 (which in turn in the directions indicated by the arrows $a_1$ and $a_2$) to transfer the plate face of the matrix 13 to the spread resin and, at the same time, the cooling water W is supplied to the cylinders 10 and 11 to cool the resin. The matrix 13 above mentioned need not always be limited to a paper mould but may be of any material so long as it serves the purposes described later.

We have discovered that in order to obtain plastic printing plates 15 of fine definition it is necessary to use a matrix 13 which has the characteristic that as the heated resin is pushed into its depressions that air entrapped in the depressions will pass through the walls of the depressions but that the resin does not pass through the walls of the depressions but completely fills the depressions and thus clear and distinct printing plates will be obtained. We have discovered that a matrix 13 made of paper material such as pulp board has a suitable porosity for air but will retain and not allow the resin to pass through. Porosity tests are well known in the paper making art and a matrix may be made of the following materials: pulp board, combination board, cloth paper, air permeable molded paper, and rigid foam board, for example.

The synthetic resin employed in this invention is polyethylene, poypropylene or the like but need not be limited specifically thereto and may be any thermoplastic resin. For example, in the case of polypropylene, it is heated up to about 200° C to be molten and, in the illustrated example, a predetermined amount of molten polypropylene is supplied on the matrix cylinder 10 and the impression cylinder 11 and is spread downwardly by the rotation of both cylinders in the directions of the arrows $a_1$ and $a_2$ to transfer the plate face of the matrix 13 on the spread resin. Means for supplying the molten resin 14 may be, for example, a nozzle N of a known extruder which is placed above the gap defined between the cylinders 10 and 11 and the nozzle is adapted to extrude a predetermined amount of molten resin 14 intermittently. If necessary, a suitable die is attached to the tip of the nozzle N to supply molten resin of predetermined length and thickness between the cylinders 10 and 11. Further, by extruding the molten resin 14 in synchronism with the rotation of the cylinders 10 and 11, printing plates can be produced continuously and finished printing plates 15 can be peeled off from the matrix cylinder 10 at the position indicated by imaginary lines in FIG. 4.

The thickness of the printing plate 15 is usually 1.0 to 1.5mm and can be selected accurately by adjusting the distance between the axes of the cylinders 10 and 11.

One feature of the present invention lies in the cooling of the molten resin during its spreading process. The peripheral surface 11*b* of the impression cylinder 11 is cooled by the cooling water W and makes direct contact with the spread resin 15' but the peripheral surface 10*b* of the matrix cylinder 10 is cooled by the cooling water W and makes indirect contact with the spread resin 15' through the matrix 13, so that the surface portion of the spread resin 15' making direct contact with the peripheral surface 11*b* of the cylinder 11 is cooled more rapidly than the inner portion (the transfer surface) making contact with the matrix 13. That is, since the surface portion of the molten resin pressed against the plate face of the matrix 13 is cooled more slowly than the portion pressed against the peripheral surface 11*b*, the molten resin on the side of the cylinder 10 is pushed fully into the corners and hollows of the matrix 13. The molten resin on the side of the impression cylinder 11 is cooled more rapidly than that on the side of the matrix cylinder 10. Accordingly, the printing plate 15 thus produced has a plate face which faithfully reproduces the matrix 13 and since the printing plate 15 is moved out of contact with the impression cylinder 11 while still sticking to the matrix 13 and the cylinder 10, and the printing plate 15 can be readily removed from the latter. In the illustrated example, one matrix 13 is wrapped around substantially a 180° portion of the peripheral surface 10*b* of the matrix cylinder 10, but by mounting another matrix on the remaining portion of the peripheral surface symmetrically with the former, two printing plates can be obtained during one cycle of rotation of the cyinders 10 and 11. Of course, in this case, the molten resin 14 is extruded from the nozzle N twice during each rotation.

Since the matrix allows air to pass therethrough but does not allow the molten resin 14 to pass through, a clear and distinct imprint will be molded into the resin.

The printing plate 15 thus obtained has a very accurate plate face and a predetermined thickness.

In order to assemble such a printing plate 15 with the plate cylinder 1 above described in connection with FIG. 1, the so-called fins projecting from the margins of the printing plate 15 are cut off to form a predetermined size and the curved printing plate 15 is inverted and then mounted on the plate cylinder 1. In this case, a saddle may be employed for compensating the difference in thickness between the printing plate and the prior stereotype, but by suitably designing the plate cylinder, it is possible to dispense with the saddle. In any case, the printing plate 15 produced by the present invention is far lighter than the conventional stereotype. The stereotype is approximately 10mm and the specific gravity of its material is more than 11.3, while the specific gravity of the synthetic resin is less than 1.5 and the thickness of the synthetic resin printing plate is 1.0 to 1.5mm. Therefore, the printing plate of this invention can be easily assembled with the plate cylinder.

FIG. 5 illustrates a modified form of this invention. Reference numeral 10 designates a matrix cylinder, 11 an impression cylinder, 10*a* and 11*a* shaft tubes and 13 two matrixes wrapped on the peripheral surface 10*b* of the matrix cylinder 10. The construction of the cylinders and the cooling means are identical with these employed in the foregoing example. In this case, however, both cylinders 10 and 11 are mounted as shown and a flat plate 16 made of, for example, a metal of high heat conductivity is interposed to pass horizontally between the cylinders 10 and 11. The flat plate 16 is transferred in one direction (indicated by an arrow $a_5$) in accordance with the peripheral speeds of the cylinders and, at the same time, molten resin 14 is spread between the flat plate 16 and the matrix 13 to transfer the plate face of the matrix 13 to the surface of the resin making contact with the matrix 13. Also, the surface portion of the molten resin 14 contacting the plate 16 is cooled more rapidly than the portion pressed against the matrix 13, to provide the same results as those obtainable with the foregoing example and a printing plate 15' is obtained on the cylinder 10, and the printing plate 15 may be removed from the cylinder 10 upwardly as indicated by dot-dash lines.

In the present example, many flat plates 16 are connected, for example, by chains 17 at predetermined intervals and moved in a horizontal direction from left to right as indicated by an arrow $a_5$ in the figure and a constant amount of molten resin 14 is supplied onto each of the flat plates 16 at the left-hand position in the figure and passed between both cylinders to transfer the plate face of the matrix 17 to the resin. The width and length of each flat plate 16 are selected substantially equal to the axial length of each cylinder and a little greater than one half the length of the circumference of each cylinder. The molten resin 14 is placed on each plate 16 at the right-hand area thereof in the figure. Though not shown, many flat plates 16 are connected together in an endless manner. Reference numeral 18 indicates carrier rollers for the flat plates 16.

Such a construction as above described is intended as being merely illustrative of this invention. For example, the flat plates 16 may be adapted to reciprocate instead of moving in an endless manner. Further, it is also possible to form the flat plates hollow and cool them with water as is the case with the cylinders 10 and 11. The flat plates 16 may also be cooled by blowing a gas such as air or the like against them from beneath (indicated by arrows $a_6$) in the figure. The printing plate producing apparatus of this invention may be variously modified. In any case, spreading of the molten resin 14, transfer of the plate face of the matrix thereto and cooling thereof will be readily understood from the description in connection with the foregoing example.

As has been described above, the present invention is based on a novel concept of making the reproduction printing plate of a synthetic resin with the rolling system. With the method of this invention, it is possible to avoid almost all of the defects encountered in conventional stereotype and printing plates of synthetic resin. The printing plate of this invention does not necessitate back scraping required for the conventional synthetic resin printing plate and can be made by pressing a synthetic resin on the matrix for a shorter time than that required for the conventional printing plate. According to our experiments in which polypropylene was molten at about 200° C and the cylinders 10 and 11 were driven at a speed of 5.5m per minute, and a clear transfer plate face was obtained. The length of 5.5m corresponded to those of printing plates of six pages of a newspaper and error variations in the thickness was with ±25 microns.

Thus, the method of this invention removes bottlenecks in newspaper printing previously described and is useful for making printing plates for other ordinary printing.

With reference to FIGS. 6–16, another embodiment of this invention will be described.

Figure 6:
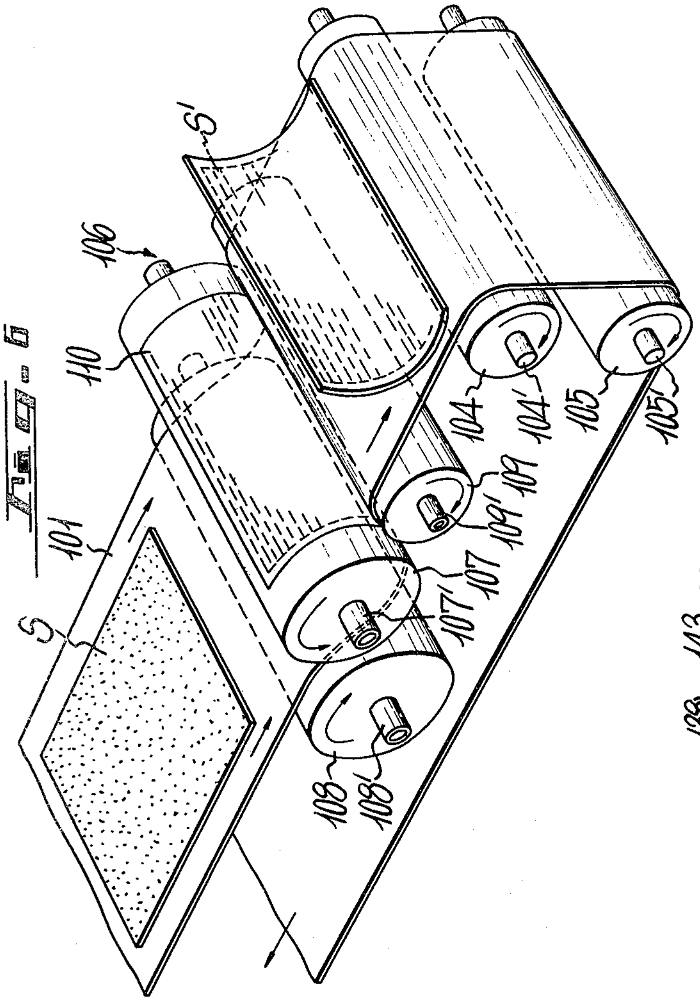
FIG. 6 is a perspective view for explaining the principal part of another example of this invention.

In FIG. 6, reference numeral 101 indicates a heat resistant endless conveyor driven in the direction of the arrows by, for example, pairs of turn rolls (not shown) and 104 and 105 which are mounted across the conveyor 101 at both ends of the conveyor 101. The conveyor 101 passes through a rolling section 106 while the conveyor 101 is driven. The rolling section 106 consists of a matrix roller 107 which engages the upper face of the conveyor 101 and press rolls 108 and 109 which make rotary contact with the underside of the conveyor 101 and a matrix 110, as for example which is molded from paper and which is air permeable but stops resin, is wrapped around the matrix roll 107.

Both press rolls 108 and 109 are disposed in predetermined parallel but spaced relation to the matrix roll 107 to direct the conveyor 101 around the matrix roll 107 over a certain desired angular range. The rolls and conveyor are driven in synchronism with one another.

With such an arrangement, a sheet of softened resin S is placed on the conveyor 101 and fed to the rolling section 106 where the plate face of the matrix 110 is transferred to the surface of the resin sheet S. The resin sheet S is cooled and hardened and then removed from the matrix 110 to provide a printing plate S'. Reference numerals 104' and 105' designate shafts of the turn rolls 104 and 105, and 107', 108' and 109' sleeves of the matrix roll 107 and the press rolls 108 and 109. The rolls are hollow. The matrix 110 may be made of the same porous materials as the matrix 13 such as pulp board, combination board, cloth paper, air permeable molded paper, and rigid foam board, for example.

Figure 7:
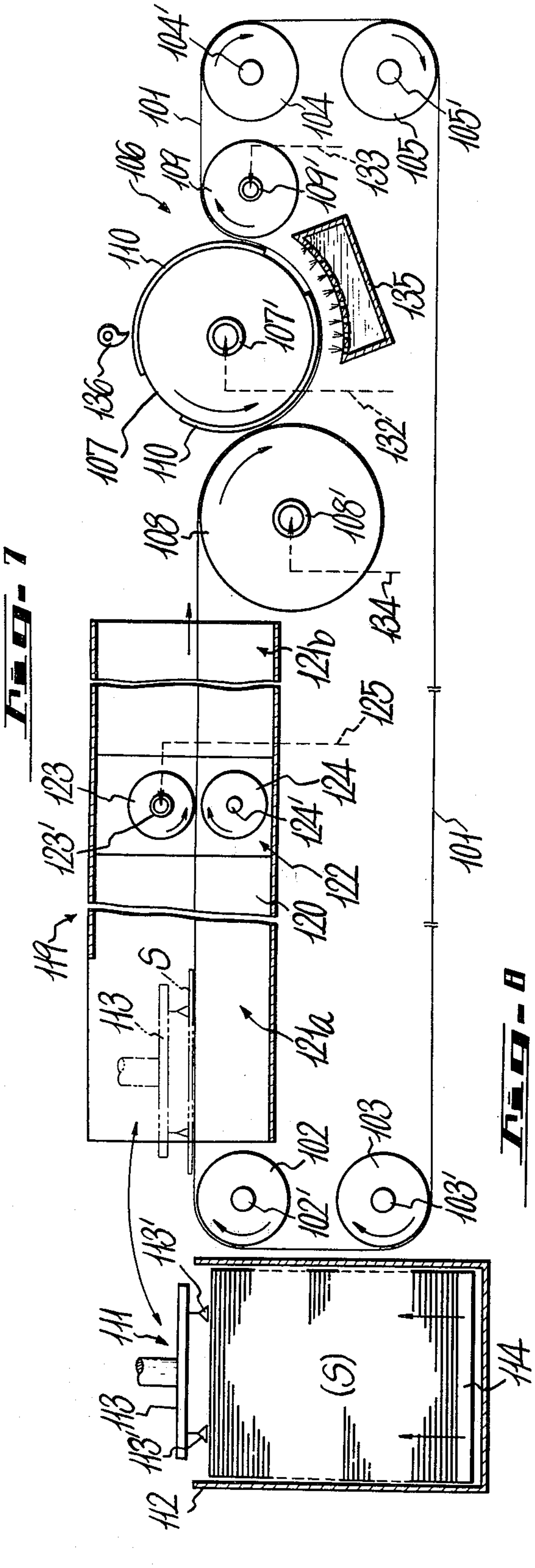
FIG. 7 is a schematic side view showing a practical embodiment of apparatus for making a reproduction printing plate according to this invention.

FIG. 7 is a schematic diagram illustrating one embodiment of apparatus for making a printing plate according to the principle of FIG. 6, in which parts corresponding to those in FIG. 6 are identified with the same reference numerals and characters. The shafts 102', 103', 104' and 105' of the turn rolls 102, 103, 104 and 105 and the sleeves 107', 108' and 109' of the matrix roll 107 and the press rolls 108 and 109 are all journalled by bearings (not shown) in an apparatus frame. Reference numeral 111 designates a sheet supply section which is disposed forwardly of the conveyor 101, that is, on the side of the turn rolls 102 and 103 and which is constructed to supply the sheets S of resin to the conveyor 101 one by one.

Such a sheet supply means may be constructed in various forms. In the illustrated example, many sheets S cut in a predetermined form and size are loaded, for example, in a case 112 and are sequentially fed by a vacuum pick-up 113 onto the conveyor 101. The pick-up 113 is provided with a plurality of sucking disks 113' and is connected with a vacuum pump (not shown). The pick-up 113 is reciprocated by a link mechanism or like means between positions indicated by full and imaginary lines on a predetermined cycle. In the case 112 a support plate 114 is provided for intermittently raising the sheets S mounted thereon, so that the uppermost resin sheet S is always held at substantially the same level. The resin sheet S is made of polyethylene, polypropylene or like thermoplastic resin and is about 1.2 to 1.5mm in thickness.

However, the sheet supply means above described is intended as being merely illustrative and the sheets may be supplied by any other means. It is also possible to place in the case 112 a truck which holds the resin sheets S and raise it intermittently. Alternatively, the resin sheets S may be above the upper surface of the conveyor 101 and placed on the conveyor 101 one by one by their own weight. Any means may be employed as long as it supplies the resin sheets S one by one onto the conveyor 101 at a predetermined position.

In the present invention the resin sheet S is heated while being carried by the conveyor 101 and is uniformly molten and is then fed to the rolling section 106. The conveyor 101 is made heat resistant.

Figure 8:
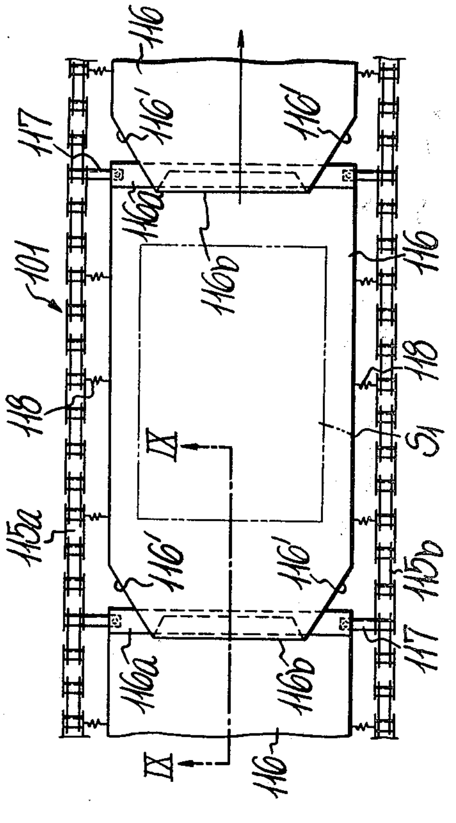
FIG. 8 is a plan view illustrating one example of a conveyor employed in the example of FIG. 7.
Figure 9:
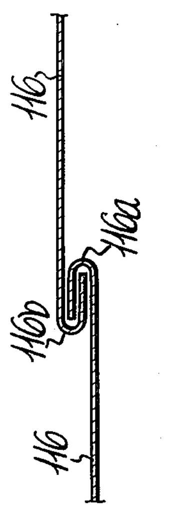
FIG. 9 is a cross-sectional view taken on the line IX—IX in FIG. 8.

FIG. 8 shows one example of the construction of the conveyor 101 in which two endless roller chains 115*a* and 115*b* are disposed in parallel and many steel sheets 116 of the same construction are arranged therebetween. Right- and left-hand sides of the substantially rectangular steel sheets 116 and which are about 0.3mm thick are bent to form bent portions 116*a* and 116*b* for engagement with adjacent steel sheets (refer to FIG. 9) and rods 117 extending inwardly from roller shafts of the chains on both sides are inserted into the bent portions 116*a* of the steel sheets 116 and fixed therein and the longer sides of the steel sheets 116 are connected at a plurality of places by springs 118 to the roller chains corresponding thereto. Reference numerals 116' designate cutouts of the left-hand corners of the steel sheets 116.

The reasons why the conveyor 101 is constructed as above described are to absorb expansion and shrinkage of the steel sheets 116 and to adapt them for the construction of the heating unit described hereinbelow. Reference character $S_1$ indicated by imaginary line designates the position where the resin sheet is placed.

Referring back to FIG. 7, the heating section will be described. Reference numeral 119 indicates generally a heating unit through which the conveyor 101 is passed to heat the resin sheet S mounted thereon by the aforementioned sheet supply means 111 and which is a furnace 120 consisting of a rolling section 122 and preheating and melting sections 121*a* and 121*b* disposed forwardly and backwardly thereof respectively. In the furnace 120 the resin sheet S is heated first in the preheating section 121*a* up to a temperature immediately below the melting point of the resin and then fed to the rolling section 122 to remove deformation of the resin sheet S caused by the preheating and then heated in the melting section 121*b* to be molten. In the rolling section 22, rolls 123 and 124 are disposed on and under the conveyor 101, respectively. The operation of the rolling section 122 will be described in detail later. A sleeve 123' of the upper roll 123 and a shaft 124' of the lower roll 124 are both journalled to side plates of the furnace 120 or the like, respectively, and a cooling water pipe 125 is coupled by a rotary joint or like means to the sleeve 123' of the roll 123 as indicated by broken line and cooling water is discharged from the sleeve on the opposite side. The roll 123 is hollow to permit circulation therethrough of the cooling water.

Figure 10:
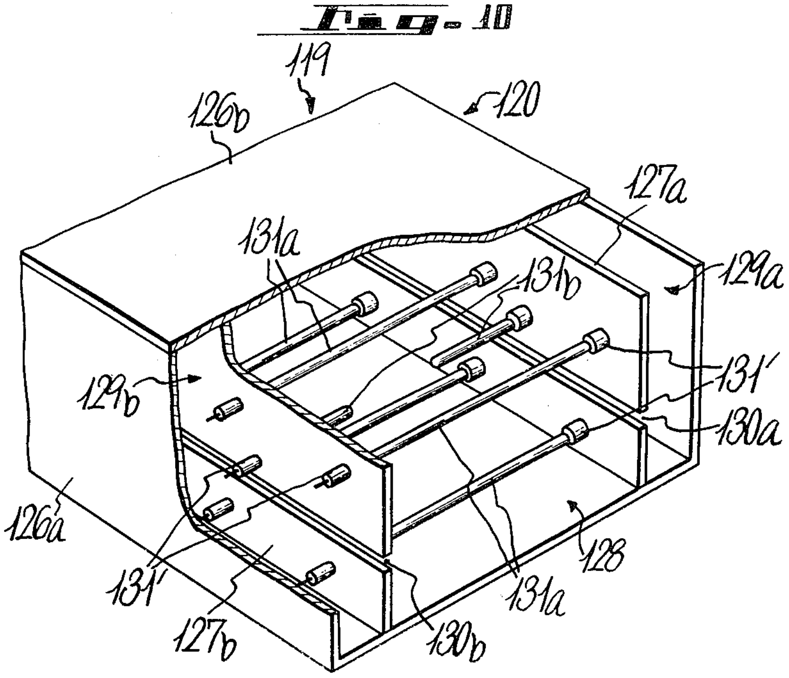
FIG. 10 is a perspective view showing one example of the construction of a heating section used in the embodiment of FIG. 7.
Figure 11:
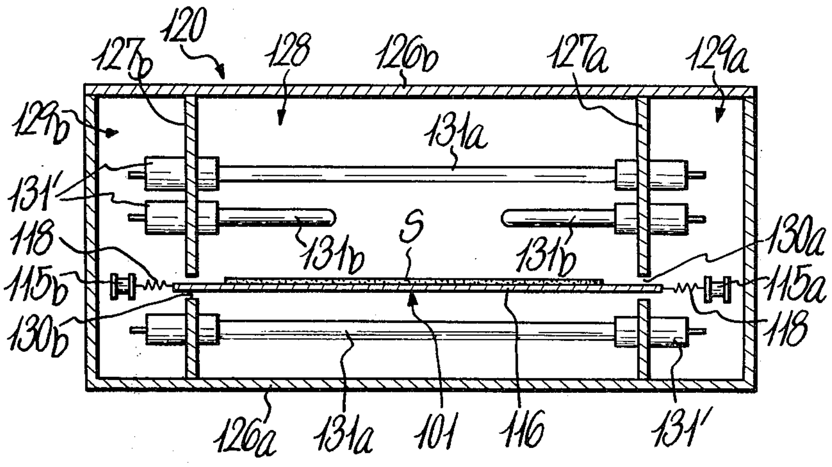
FIG. 11 is a cross-sectional view showing the principal section of the heating section.

In FIG. 10 there is illustrated the principal part of one example of the heating unit 119, that is, the furnace 120. Reference numeral 126*a* designates a U-shaped furnace proper and 126*b* a cover therefore, and in the illustrated example, the furnace 120 has a flat, rectangular cross-section. Reference numerals 127*a* and 127*b* indicate partitions made of an adiabatic material which are disposed in the furnace 120 near both side plates to divide the furnace 120 into a steel sheet path 128 and chain paths 129*a* and 129*b*. The partitions 127*a* and 127*b* have slits 130*a* and 130*b* symmetrically formed in the lower portions thereof to permit the passage of the conveyor 101 as depicted in FIG. 11. Both side marginal portions of the steel sheets 116 are held in both slits 130*a* and 130*b* and the roller chains 115*a* and 115*b* are driven in the chain paths 129*a* and 129*b*.

As will be seen from the foregoing, the steel sheet path 128 is a heating chamber and heating means employed therein comprise long and short infrared heaters 131*a* and 131*b*. These infrared heaters are arranged above and below the conveyor 101 between both partitions at certain intervals as shown in the figures. The longer infrared heaters 131*a* and the shorter ones 131*b* are arranged above the conveyor 101 and the longer infrared heaters 131*a* are also arranged below the conveyor 101. Wiring to terminals of stems 131' of the heaters is made on the sides of the chain paths. With the infrared heaters thus arranged, the resin sheet S on the steel sheet 116 can be uniformly heated. Further, since the chain paths 129*a* and 129*b* are shielded from the steel path 128 by the partitions 127*a* and 127*b* of the adiabatic material, the roller chains 115*a* and 115*b* are never heated. A damper for adjusting the temperature of the atmosphere in the furnace and the like is provided on the cover 126 of the furnace 120 at necessary positions, though not shown.

The infrared heaters used as heating means are not necessarily requisite for this invention.

Figure 12:
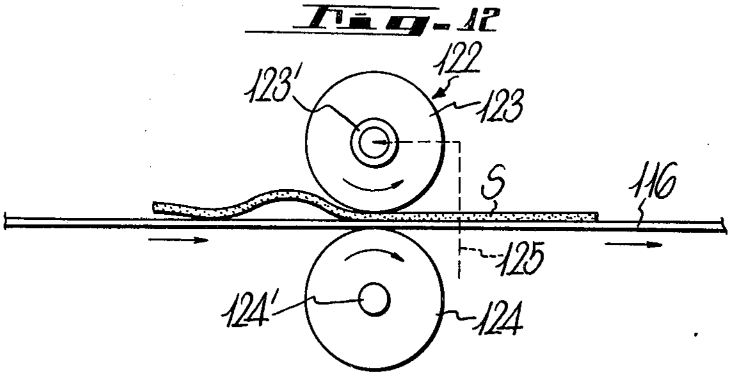
FIG. 12 is a diagram for explaining the operation of a squeeze section employed in the embodiment of FIG. 7.

Turning now to FIG. 12, the operation of the aforementioned rolling section 122 will be described. The upper and lower rolls 123 and 124 and the conveyor 101 (that is, the steel sheets) are driven in synchronism with one another with the upper roll 123 being spaced a predetermined distance apart from the conveyor 101 with the lower roll 124 making rotary contact with the underside thereof. FIG. 12 shows the manner in which the resin sheet S placed on the steel sheet 116 at a predetermined position (refer to FIG. 8) is brought into the rolling section 122 after having passed through the preheating section 121*a* as depicted in FIG. 7. The resin sheet S is heated by the preheating section 121*a* up to a temperature immediately below the melting temperature of the resin and is thereby deformed, but when fed to the rolling section 122, the resin sheet S is transferred in a direction of an arrow while being rolled out flat in a uniform thickness between the upper face of the steel sheet 116 and the peripheral surface of the roll 123. In this case, since cooling water is supplied to the inside of the roll 123 from the pipe 125 as previously described, the resin sheet S does not adhere to the peripheral surface of the roll 123 and it is transferred in close contact with the upper face of the steel sheet 116 which is higher in temperature than the roll 123 and then the resin sheet S is molten while passing through the melting section 121*b* and is supplied to the rolling section 106 (FIG. 7).

The construction of the rolling section 106 for molding the resin sheet S by rolling can be understood from the description of FIG. 6. As illustrated in FIG. 7, pipes 132 and 133 for cooling water, indicated by broken lines, are coupled with the sleeves 107' and 109' of the matrix roll 107 and the press roll 109, respectively, as is the case with the aforementioned roll 123. A pipe 134 for hot water, indicated by a one-dot chain line is coupled with the sleeve 108' of the press roll 108, to hold the peripheral surface of each roll, especially that of the press roll 108 at a predetermined temperature (60° to 80° C). Further, a cooler 135 (using water or air) is provided for cooling the underside of the conveyor 101 (the steel sheet 116) corresponding to the peripheral surface of the matrix roll 107, so that suitable temperature changes occur on both sides of the resin sheet S as it is drawn between the matrix 110 of the matrix roll 107 and the steel sheet 116, thereby to cool and harden the resin sheet S while achieving highly faithful transfer of the plate face of the matrix 110 to the resin sheet S, thus providing a printing plate S' of accurate thickness (refer to FIG. 6).

The rolling section 106 is designed so that the distances between the axes of the rolls can be adjusted by the use of, for example, an eccentric bearing construction. In FIG. 7, reference numeral 136 indicates a pawl disposed near the upper portion of the matrix roll 107 for tearing off the printing plate from the matrix 110.

A detailed description will be given in connection with the process of the molding of the resin sheet S in the rolling section 106 and the state of the resin sheet S therein. The resin sheet S which has been made homogeneously molten in the melting section 121*b* (the temperature of the sheet being 150° to 175° C in the case of polyethylene and 200° to 250° C in the case of polypropylene) is first drawn in between the matrix 110 of the matrix roll 107 and the press roll 108 together with the steel sheet 116. Since the press roll 108 is held at a temperature ranging from 60° to 80° C as above described, the relief of the matrix is transferred very accurately onto the resin sheet S pressed on the matrix 110. The temperature of the press roll 108 was selected based upon the results of our experiments and this is a temperature at which the transferred plate face of the molten resin sheet S can be maintained in an optimum condition.

In such a molding, spring-back is caused a little due to the property of resin but this can be prevented from exerting a bad influence upon the faithful transfer of the plate face by selecting the thickness of the resin sheet S in anticipation of such spring-back phenomenon. The resin sheet S is formed about 0.2mm thicker than the finished printing plate S' and its melting temperature is selected as previously described. Thus, the resin sheet S is held in the so-called bank condition in the transfer process to obtain a highly faithful plate face; and until the resin sheet S is brought to the press roll 109, it is rapidly cooled by the cooler 135 through the steel sheet 116, by which the hardened printing plate S' is made to have a predetermined thickness, for example, 1.0mm. The above hardening temperature is 100° C for polyethylene and 170° C for polypropylene.

It must be noted that since the transfer face of the resin sheet S makes indirect contact with the matrix roll 107 through the matrix 110 of low heat conductivity in the rolling process above described, it is cooled later than the back thereof. This makes the plate face clearer. The definition of the thickness of the molten resin sheet S can be achieved with adjustment of the distance between the axes of the rolls 123 and 124. Accordingly, it is preferred to make the bearing constructions of the rolls 123 and 124 adjustable as is the case with those of the rolls of the rolling section 106.

The following will describe means for assembling the matrix 110 with and disassembling it from the matrix roll 107. In the present example, two matrixes 110 are wrapped around the matrix roll 107 and two printing plates S' are obtained in one revolution.

Figure 13:
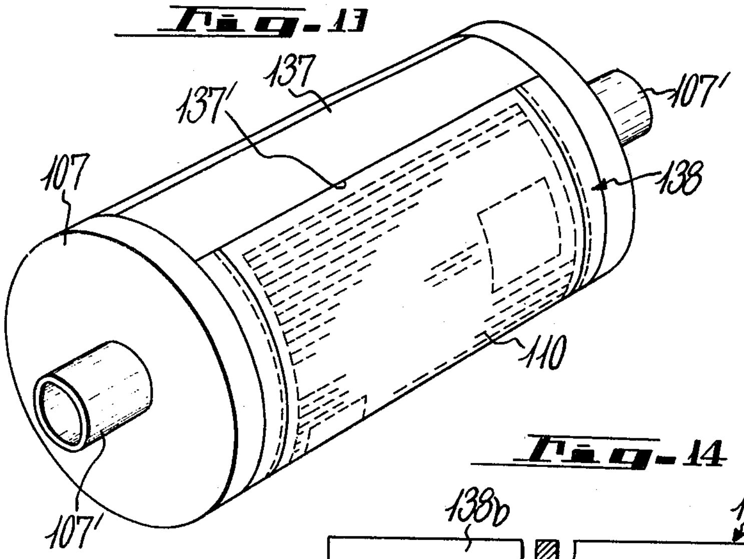
FIG. 13 is a perspective view illustrating a matrix roll used in the embodiment of FIG. 7.
Figure 14:
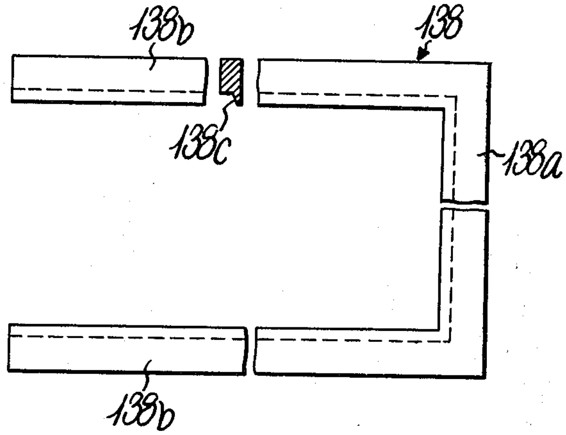
FIG. 14 is a plan view showing a press ruler used in this invention.

FIG. 13 shows the matrix roll 107, around which striking rulers 137 of a predetermined width are provided symmetrical positions, and one side of the matrix 110 is urged against a longer edge 137' of each ruler 137 and both marginal portions and that of the other side of the matrix 110 are firmly pressed against the peripheral surface of the roll 107 by press ruler 138. The press ruler 138 is a U-shaped ruler of such curvature so that it substantially conforms to the radius of the matrix roll 107. FIG. 14 shows a developed plan view of the press ruler 138. The press ruler 138 is made of a magnetic material such, for example, as an iron alloy and is formed substantially rectangular in cross-section in its base 138*a* and legs 138*b* and has projections 138*c* formed on the inner upper edge, as illustrated.

Figure 15:
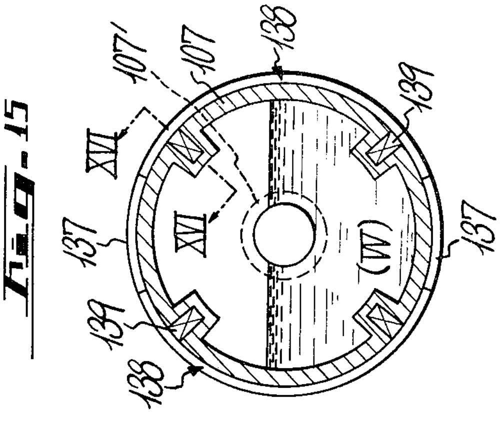
FIG. 15 is a cross-sectional view illustrating the principal part of the matrix roll.
Figure 16:
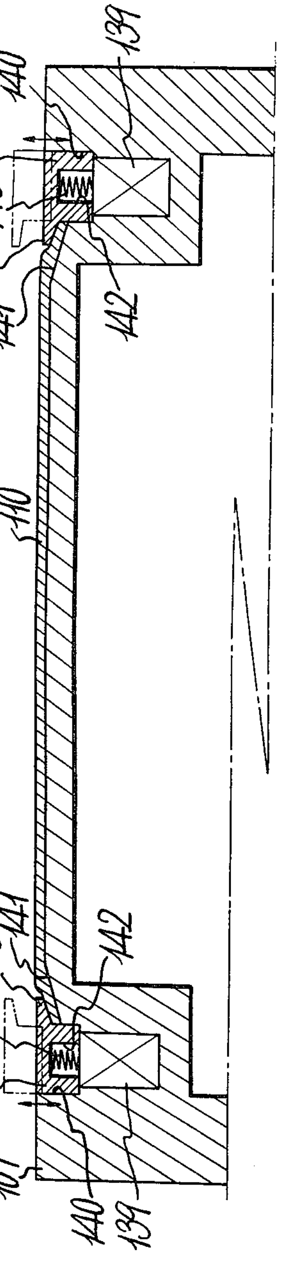
FIG. 16 is a detailed cross-sectional view taken on the line XVI—XVI in FIG. 15.

Means for fixing the press ruler 138 on the matrix roll 107 is shown in FIGS. 15 and 16, in which a plurality of, for example, four electromagnets 139 for each press ruler 138 are provided on the side of the matrix roll 107 at places corresponding to the inner face of the press ruler 138 and these electromagnets 139 are energized to attract the ruler 138 thereto. One side of the matrix 110 is pushed against the ruler 137 to position the matrix 110 in the circumferential direction of the matrix roll 107 and the projections 138*c* of the press ruler 138 are put on both marginal portions of the matrix 110 and the other side thereof and then the electromagnets 139 are energized so that matrix 110 can be brought into close contact with the peripheral surface of the matrix roll 107.

FIG. 16 is a cross-sectional view taken on the line XVI—XVI in FIG. 15. The legs 138*b* of the press ruler 138 lie in grooves 140 formed in both marginal portions of the matrix roll 107. The grooves 140 are formed between the striking rulers 137 and contiguous to each other in the form of a U along one longer edge of each of the rulers 137. The groove 140 is formed to conform to the press ruler 138. The inner marginal portion of the groove 140 is planed off as indicated at 141 to hold the marginal portion of the matrix 110 between the former and the projections 138*c* of the press ruler 138 and the pole of each electromagnet 139 is exposed at the bottom of the groove 140.

Further, in the present example, blind holes 142 are formed in the inside of the leg 138*c* at places corresponding to the electromagnets 139 and coiled springs 143 are inserted into the blind holes 142. When the electromagnets 139 are deenergized in the illustrated conditions, the leg 138*b*, that is, the press ruler 138 pops up to the position indicated by an imaginary line. Wirings for the electromagnets 139 are led to one side of the matrix roll 107 or to an operation board or panel for controlling the entire apparatus, so that the electromagnets 139 can be energized and deenergized with actuation of a single pushbutton or the like. Thus, the matrix 110 can be assembled with or disassembled from the matrix roll 107 easily and rapidly. In this case, the matrix roll 107 is moved up. In FIG. 15, reference character W indicates the cooling water in the matrix roll 107.

The construction of each part of the apparatus of this invention and the operation of the entire apparatus will be seen from the foregoing but its driving and control systems may be designed in various manners. For example, in the driving system, in order to synchronize the peripheral speeds of the rolls of the rolling section 106 and the upper and lower rolls of the rolling section 122 with the speed of the conveyor 101, it is possible to use the conveyor 101 as a driving source and to provide sprocket wheels on both end portions of each roll in meshing relation to the roller chains 115*a* and 115*b* of the conveyor 101 and to drive the sprocket wheels. It is also possible to use any of the rolls of the rolling section 106 as a driving roll and to drive the other rolls in synchronism through the conveyor 101. Further, means for adjusting the distances between the axes of the rolls of the rolling sections 106 and 122 need not be limited specifically to the aforementioned eccentric bearings but may comprise various axis adjusting means. In some cases, clutches, brakes or the like are mounted on the rolls of the rolling section 106.

Further, the control system is designed mainly on the basis of the moulding cycle of the rolling section 106 in association with which the cycle for supplying the resin sheet S in the supply section 111 is selected and the temperature of the heating section 119 and means for circulating the cooling water and hot water to the rolls are controlled.

However, there are matters of choice in deisgn; and this invention may be modified within the scope of its subject matter.

In any case when many resin sheets S made of polyethylene, polypropylene or like thermoplastic synthetic resin are loaded in the supply section 111 and the apparatus is put in operation, the resin sheets S are supplied and placed one by one on the conveyor 101 at predetermined positions and brought into the heating section 119 in which the resin sheets S are heated to a predetermined temperature while being moved in the preheating section 121*a*. Then, the resin sheets S deformed by preheating are rolled in the rolling section 122 and transferred to the melting section 121*b* in which they are homogeneously molten. Thereafter, the molten resin sheets S are drawn in the rolling section 106 to mould them by rolling as previously described in detail, thus providing the printing plates S′ having highly faithful plate faces and accurate thicknesses. It is noteworthy that such a series of processes can be achieved continuously and automatically and with high speed.

In order to assemble the printing plate thus produced with a plate cylinder of a rotary press or the like, the fins projecting from the margins of the printing plate are cut off in accordance with a predetermined size and the curved printing plate is inverted and then mounted on the plate cylinder. In this case, the printing plate is mounted on the peripheral surface of the plate cylinder through a saddle for attachment but the mounting means itself does not directly relate to the present invention. Further, the use of the printing plate made by the apparatus of this invention is not always limited specifically to a rotary press but the printing plate can be used with flat plate printers.

With the present invention, almost all of the defects experienced in the prior art hydraulic press system can be eliminated; the plate face of the finished resin printing plate is clear; the thickness of the printing plate is accurate and no back scraping is required; and the rate of operation of the apparatus and making printing plates is high. Accordingly, the apparatus of this invention makes printing plates for use with high-speed rotary presses and is suitable for making other ordinary printing plates.

Although it has been described with respect to preferred embodiments, it is not to be so limited as changes and modifications may be made which are within the full intended scope as defined by the appended claims.

We claim as our invention:

1. An apparatus for making reproduction printing plates comprising, a matrix which is air permeable but stops molten theremoplastic material from passing therethrough, a roll member, said matrix being detachably mounted on the outer surface of said roll member, an opposing member disposed against said roll member with a predetermined gap therebetween means for supplying molten thermoplastic material to said gap, and means for driving at least one of said roll and opposing members to press and roll said molten thermoplastic material and form said reproduction printing plates therefrom.

2. Apparatus for making reproduction printing plates according to claim 1 wherein said matrix is made of paper.

3. An apparatus of making reproduction printing plates as claimed in claim 1 further including a means for hardening said molten thermoplastic material during its pressing and rolling.

4. An apparatus of making reproduction printing plates as claimed in claim 3 in which said hardening means is a cooling device which supplies fluid to said molten thermoplastic material.

* * * * *